United States Patent
Lai

(10) Patent No.: US 7,233,490 B1
(45) Date of Patent: Jun. 19, 2007

(54) POSITIONING CLAMP FOR CD-ROM DRIVES AND DISKETTE DRIVES

(75) Inventor: Vincent Lai, Taoyuan Hsien (TW)

(73) Assignee: In Win Development, Inc., Taoyuan Hsien (TW)

( * ) Notice: Subject to any disclaimer, the term of this patent is extended or adjusted under 35 U.S.C. 154(b) by 6 days.

(21) Appl. No.: 11/328,915

(22) Filed: Jan. 9, 2006

(51) Int. Cl.
*G06F 1/16* (2006.01)

(52) U.S. Cl. ........................ 361/685; 361/684; 361/724

(58) Field of Classification Search ................. 361/684, 361/685
See application file for complete search history.

(56) References Cited

U.S. PATENT DOCUMENTS 6,282,086 B1 *  8/2001  Loh et al. .................... 361/684
6,330,147 B1 * 12/2001  Adams et al. ............... 361/679
6,580,607 B1 *  6/2003  Feldmeyer ................... 361/685
6,795,309 B2 *  9/2004  Hartung et al. ............. 361/685
2007/0019379 A1 *  1/2007  Hsiao .......................... 361/685

* cited by examiner

*Primary Examiner*—Anatoly Vortman
*Assistant Examiner*—Anthony Q. Edwards
(74) *Attorney, Agent, or Firm*—Pro-Techtor Int'l Services

(57) ABSTRACT

The present invention relates to a positioning clamp for CD-ROM drives and diskette drives, characterized in that no tools are required, but only clamps located at the periphery of a frame are needed to easily and rapidly position the CD-ROM drive and the diskette drive inside a CD-ROM slot and a diskette drive slot formed between a computer case and a computer frame.

1 Claim, 3 Drawing Sheets

POSITIONING CLAMP FOR CD-ROM DRIVES AND DISKETTE DRIVES

BACKGROUND OF THE INVENTION (a) Field of the Invention

The present invention relates to a clamp pivotally connected to the two sides of a frame of a computer case such that a CD-ROM drive or a diskette drive is securely positioned without the need of tools.

(b) Description of the Prior Art

Conventional CD-ROM drives and diskette drives are installed and positioned on a computer case by screws. As tools are needed to fasten the screws, it is time-consuming during assembling and disassembling, and moreover, screws are easily lost.

SUMMARY OF THE INVENTION

The primary object of the present invention is to provide a clamp located at the two sides of a frame of a computer case such that a CD-ROM drive or a diskette drive is easily and rapidly positioned without the need of tools.

To enable a further understanding of the objectives and the technological methods of the invention herein, the brief description of the drawings below is followed by the detailed description of the preferred embodiments.

DETAILED DESCRIPTION OF THE PREFERRED EMBODIMENTS

Figure 1:
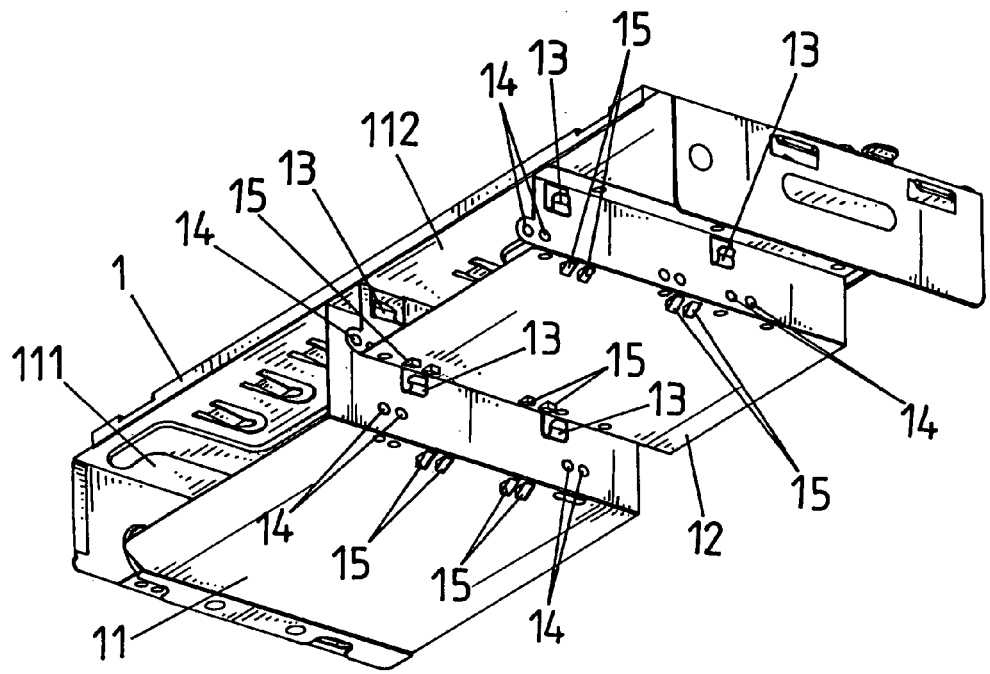
FIG. 1 shows a perspective view of the computer case of the present invention.
Figure 2:
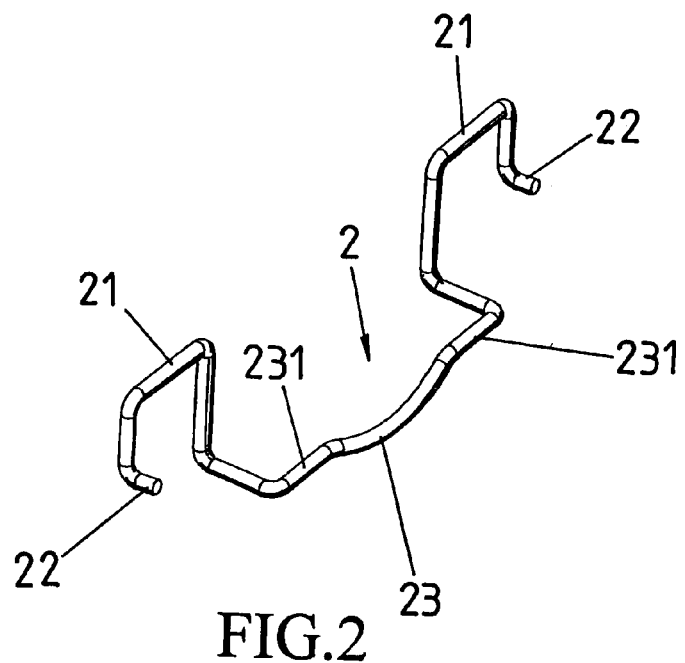
FIG. 2 shows an external view of the clamp of the present invention.
Figure 3:
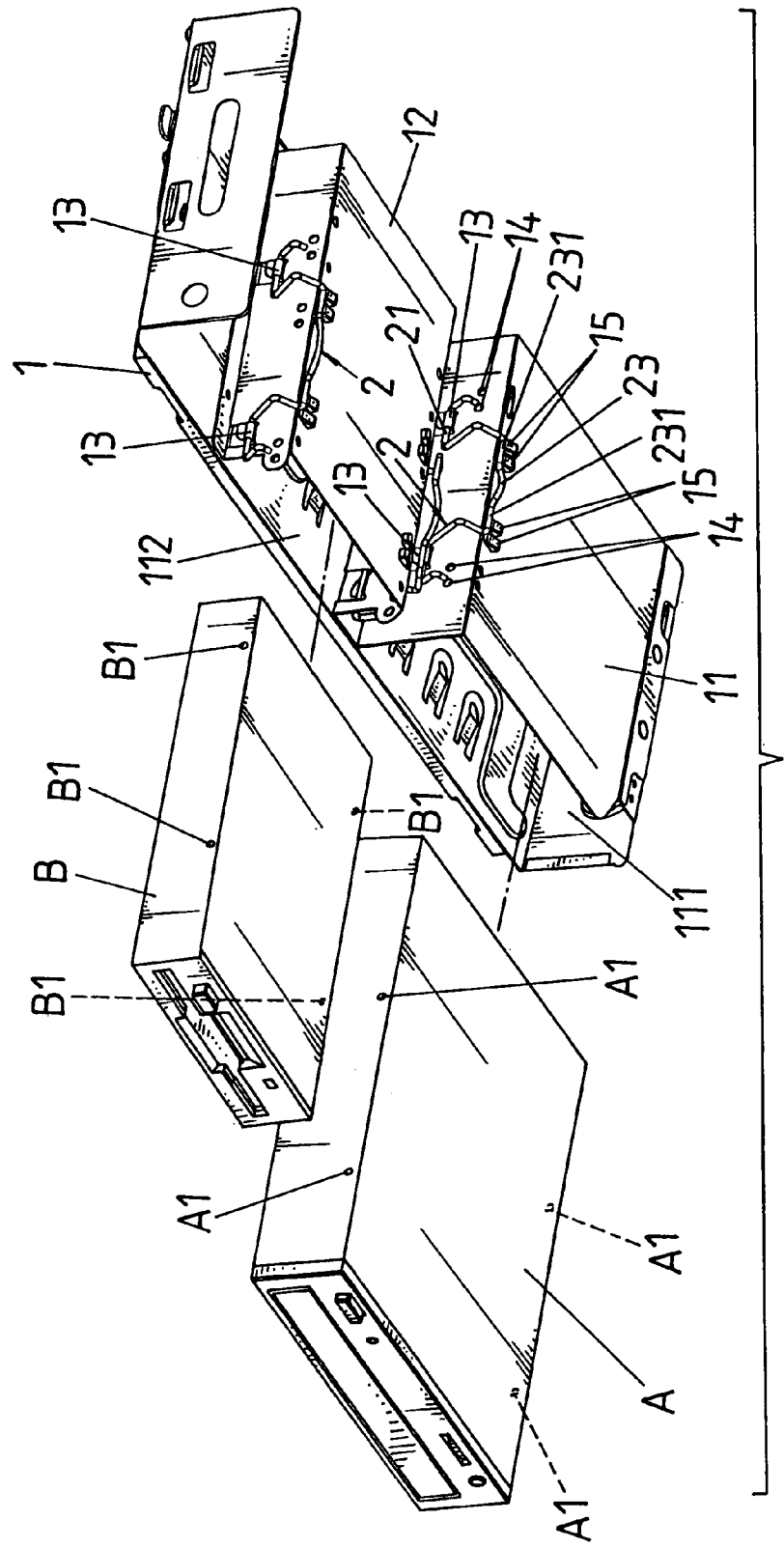
FIG. 3 shows a structural perspective view of the present invention.

Referring to FIG. 1, a computer case 1 is of a horizontal-type (the computer case 1 can also be of a vertical-type,) wherein the computer case 1 forms a CD-ROM slot 111 and a diskette drive slot 112 with each of the two U-shaped frames 11 and 12 located at a corresponding bottom of the computer case 1 for inserting a corresponding CD-ROM drive A and a diskette drive B (FIG. 3.) Two slot holes A1 and B1 are disposed on the two sides of each of the CD-ROM drive A and the diskette drive B. Referring to FIG. 1, two clamp hooks 13 and at least one clamp-hole 14 are disposed on two side-plates on the two frames 11 and 12 of the computer case 1 respectively. At least one triangular clamp-piece 15 is disposed on a bottom-plate of the two frames 11 and 12 respectively. Referring to FIG. 2 and FIG. 3, a crooked clamp 2 can be clamped on the two frames 11 and 12. A horizontal member 21 at the two ends of the clamp 2 is pivotally connected inside each of the two clamp hooks 13. Then a hook arm 22 is bent on an exterior of each of the two horizontal members 21 respectively and extended into the clamp-hole 14 of the frame 11 and 12, such that a clamping portion 231 extended at the two sides of a handle lever 23 can be clamped and positioned on the clamp-pieces 15 of the frames 11 and 12.

Figure 4:
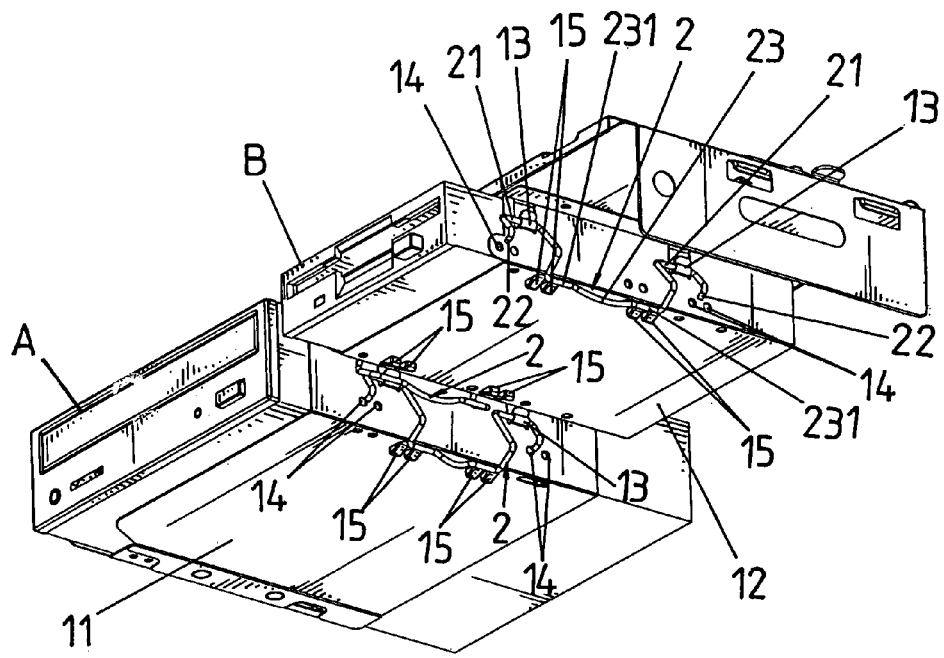
FIG. 4 shows a first diagram depicting the working condition of the present invention.
Figure 5:
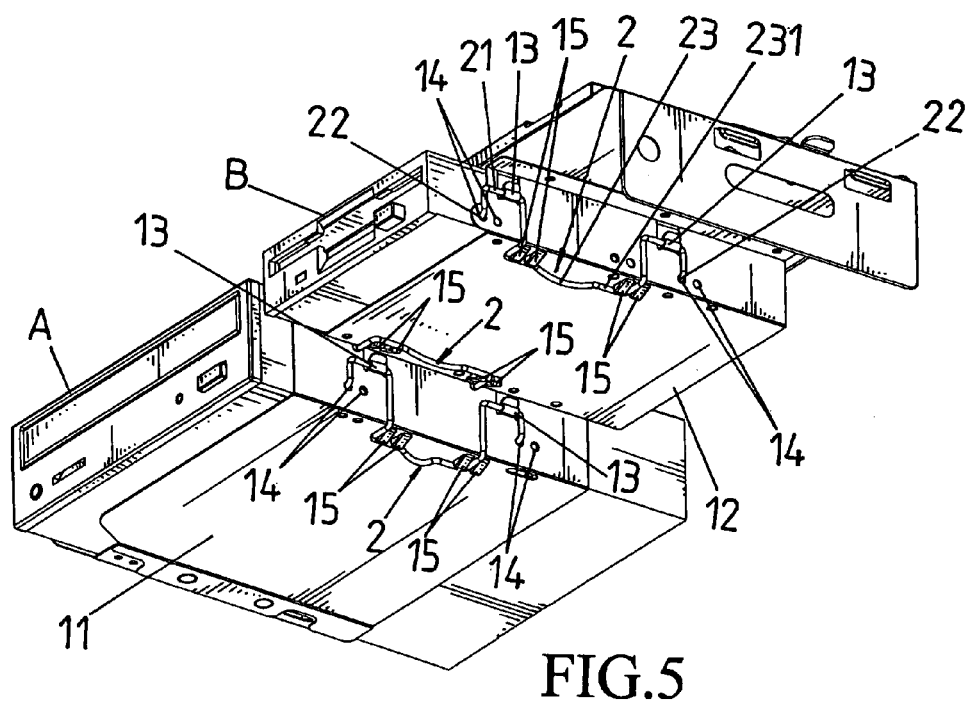
FIG. 5 shows a second diagram depicting the working condition of the present invention.

Referring to FIG. 4, the CD-ROM drive A and the diskette drive B are inserted into the CD-ROM slot 111 and the diskette drive slot 112 respectively, and the clamp 2 has not been clamped. Referring to FIG. 5, when pulling the handle lever 23 of the clamp 2, two hook arms 22 are extended into the clamp-holes 14 of the frames 11 and 12 respectively and then fixed inside the slot hole A1 and B1 on the CD-ROM drive A and the diskette drive B respectively whereas each of the clamping portions 231 at the two sides of handle lever 23 is hooked and positioned on the clamp-pieces 15 on the frames 11 and 12 respectively.

When the location of the slot hole A1 and B1 on the CD-ROM drive A or the diskette drive B changes, the horizontal arm 21 on the clamp 2 can be displaced inside the clamp hook 13. In this way, the hook arm 22 of the clamp hook 13 can be extended inside the clamp-hole 14 at the side thereof, and the two clamping portions 231 on the handle lever 23 can be clamped and positioned on the clamp-pieces 15 at the side thereof.

It is of course to be understood that the embodiment described herein is merely illustrative of the principles of the invention and that a wide variety of modifications thereto may be effected by persons skilled in the art without departing from the spirit and scope of the invention as set forth in the following claims.

What is claimed is:

1. A positioning arrangement for CD-ROM drives and diskette drives disposed on a CD-ROM slot and a diskette drive slot formed between a computer case and a frame for installing a CD-ROM drive and a frame for installing a diskette drive, respectively, comprising:

two clamp hooks and at least one clamp-hole disposed on a side-plate of each of the two frames, and at least one clamp-piece disposed on a bottom-plate of the two frames respectively;

a clamp having a horizontal member at two ends thereof and pivotally connected inside each of the two clamp hooks in the frame, and hook arms bent on an exterior of each of the two horizontal members respectively, and a handle lever in the middle of the clamp provided with two clamping portions;

wherein when installing the CD-ROM drive and the diskette drive into the CD-ROM slot and the diskette drive slot respectively, each of the two hook arms of the clamp is extended into the corresponding clamp-hole of each frame and then fixed inside the slot hole of the CD-ROM drive and the diskette drive, such that the clamping portion at the two sides of the handle lever of the clamp is hooked and positioned on the clamp-piece on the frame.

* * * * *